July 17, 1928.
C. G. CLEMENT
INDUSTRIAL TRAILER
Filed Aug. 24, 1925
1,677,618
2 Sheets-Sheet 1
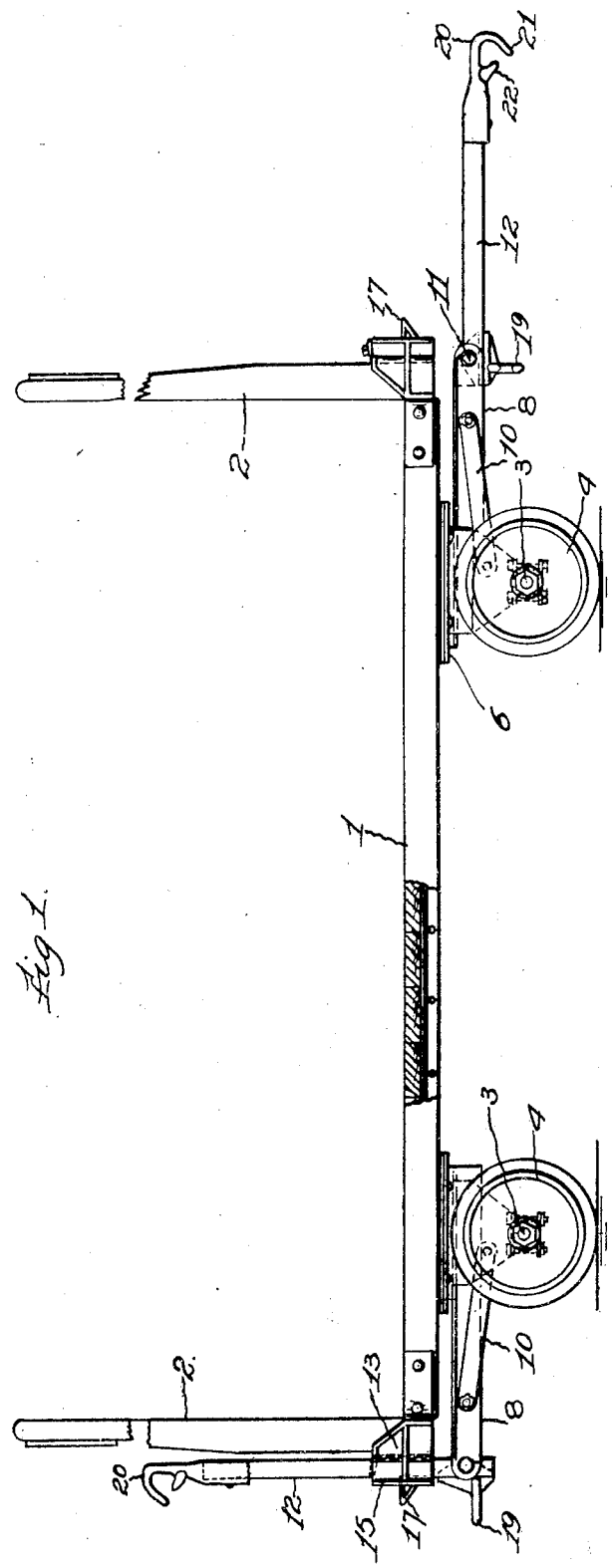
Inventor.
Charles G. Clement.
by Bunton & Bunton
his Attorneys.

July 17, 1928.  C. G. CLEMENT  1,677,618
INDUSTRIAL TRAILER
Filed Aug. 24, 1925    2 Sheets-Sheet 2
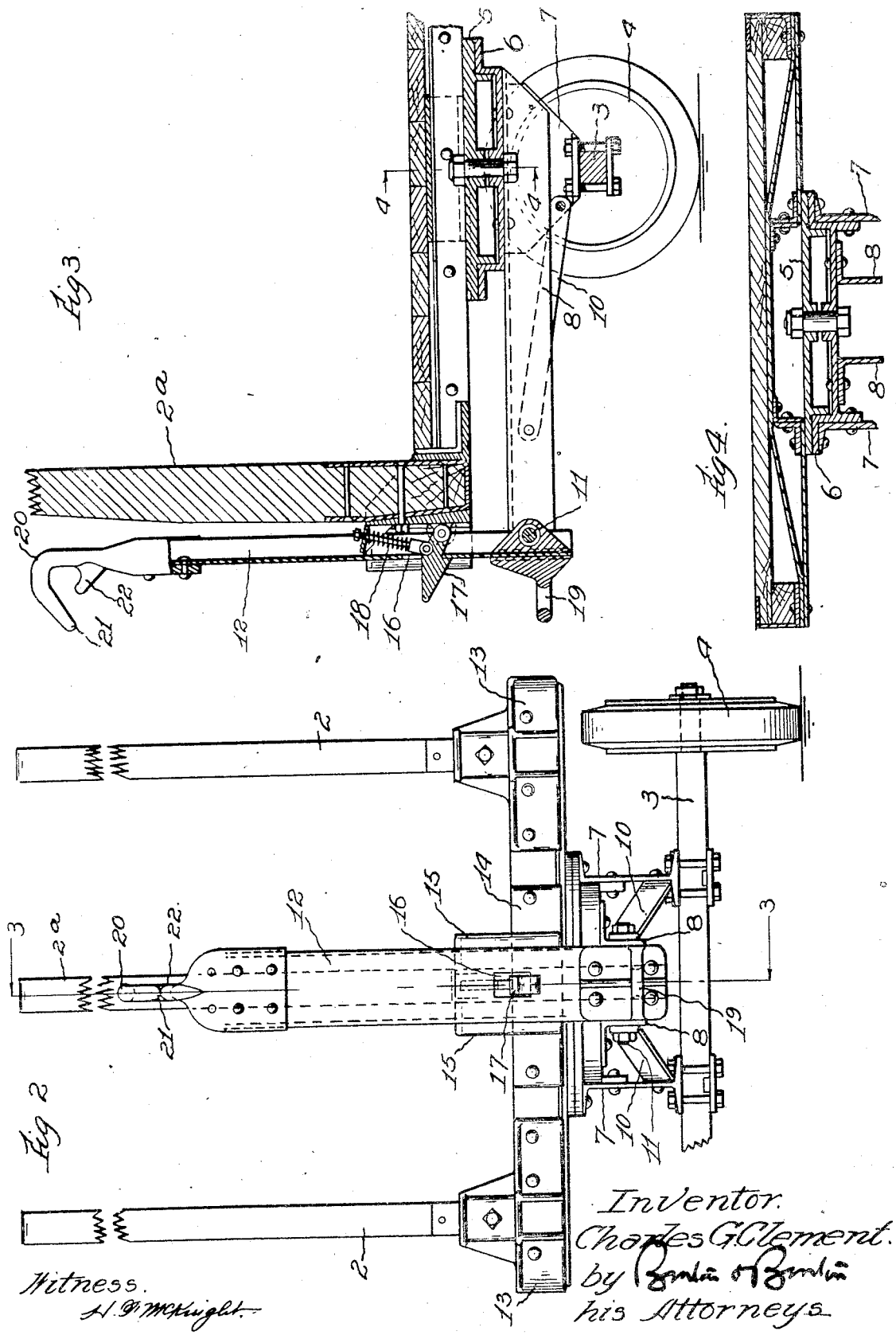
Inventor.
Charles G. Clement.
by Borden & Borden
his Attorneys
Witness.
H. P. McKnight.

Patented July 17, 1928.

1,677,618

UNITED STATES PATENT OFFICE.

CHARLES G. CLEMENT, OF EDGERTON, WISCONSIN, ASSIGNOR TO HIGHWAY TRAILER COMPANY, OF EDGERTON, WISCONSIN, A CORPORATION OF WISCONSIN.

INDUSTRIAL TRAILER.

Application filed August 24, 1925. Serial No. 51,901.

This invention relates to a truck adapted for use in industrial plants or in the handling of baggage in railway stations and adapted either to be drawn about by hand or to be coupled in trains for operation by a motor driven tractor. It consists of certain features and elements of construction in combination as herein shown and described and as indicated by the claims.

In the drawings:—

Figure 1 is a side elevation of a truck embodying this invention.

Figure 2 is a partial end elevation of the same.

Figure 3 is a vertical section of the end portion being taken as indicated at line 3—3 on Figure 2.

Figure 4 is a transverse detail section taken as indicated at line 4—4 on Figure 3.

Figure 5 is a bottom plan view of the fifth wheel and drawbar connection.

Figure 6 is a top plan view of the platform frame at one end with the planking removed and showing also the drawbar.

The particular type of body illustrated in the drawings is no part of the present invention but as shown it is the type which is adaptable to a wide range of uses. It consists of a clear platform, 1, with upright end stakes, 2. Near each end an axle, 3, is provided for relatively low wheels, 4. Each axle is dirigibly mounted on a fifth wheel whose upper member, 5, is secured to the under side of the body platform while the lower member, 6, is carried upon bolsters, 7, resting upon the axle, 3, and bolted thereto. Angles, 8, 8, secured to the under side of the member, 6, extend in parallel relation toward the end of the body platform to serve as a part of the jointed drawbar. Near their outer ends they are connected by a bolt, 9, and spacer tube thereon and braced by oblique members, 10, extending from the bolt, 9, to points of securement on the bolsters, 7.

At the extreme outer ends of the angles, 8, a horizontal pivot bolt, 11, forms the joint with the extending portion, 12, of the drawbar which is thus adapted to be swung into vertical position against the end of the truck platform when not in use. At the corners of the platform the stakes, 2, are supported in metal sockets formed in corner fittings, 13, and at the middle of its width the platform carries a fitting, 14, socketed in the middle stake, 2ª, and also having spaced vertical flanges, 15, between which the drawbar section, 12, is accommodated when it is swung into vertical position. Through a rectangular aperture, 16, in the face of the drawbar, 12, a latching hook, 17, passes as the drawbar is swung into vertical position and a spring, 18, shown in Figure 3 depresses the hook, 17, yieldingly into engagement with the edge of the aperture, 16, to retain the drawbar in upright position.

The purpose of locking the drawbar, 12, in upright position is to hold one pair of wheels, 4, rigid against steering motion when they constitute the rear wheels of the truck, the forward pair of wheels being left free for steering action. It is frequently desirable to couple these trucks or trailers in trains and for this purpose each drawbar section, 12, is provided near its pivot, 11, with a coupling eye, 19, which extends from the under side of the drawbar when the latter is in use but extends horizontally and rearwardly when the drawbar is folded to upright position as shown in Figure 3. The coupling eye is thus presented for engagement with the leading drawbar of the next trailer and preferably the eye is located as shown in Figure 3 slightly below the level of the pivot bolt, 11, so that the pull upon it tends merely to swing the section, 12, against the end of the platform rather than to place any additional strain upon the latching hook, 17.

A convenient form of terminal for the drawbar is shown comprising a hook-shaped fitting, 20, having a long rearwardly bent tang, 21, serving effectively as a handhold or for entering the coupling eye, 19. A shorter hook, 22, facing opposite the tang, 21, is designed to receive thrust and to prevent accidental disengagement of the hook, 21, from the coupling eye.

I claim:—

1. In a dirigible truck, a body, a tongue or drawbar connected for steering the wheels at one end and jointed at a point closely adjacent the vertical plane of the end of the body and at a suitable distance from the steering pivot for folding of its end portion upwardly against said end of the body, vertically extended rigid guard flanges on the end of the body between which said tongue is received for holding the wheels against steering motion and a spring catch associated with said guard flanges for retaining the tongue in upright position between said flanges.

2. A dirigible truck comprising a body with wheels at each end pivotally mounted for steering motion, a tongue or drawbar at each end connected with the wheels at that end for guiding them, each of said tongues being jointed at a point closely adjacent the vertical plane of the end of the body for folding of its end portion upwardly a substantially vertical plane against the end of the body, guard flanges on each end of the body between which the tongue at that end is received for locking the wheels against steering motion and spring catcher associated with said guard flanges for holding the tongues in upraised position.

3. In the combination defined in claim 2, each tongue having a coupling member disposed on its under side adjacent its folding joint for presentation endwise of the vehicle when the tongue is folded upwardly.

4. In the combination defined in claim 2, each tongue having a coupling member disposed on its under side adjacent its folding joint for presentation endwise of the vehicle when the tongue is folded upwardly, said coupling member being disposed slightly below the pivot axis of the tongue joint when thus presented by the upward folding of the tongue.

5. In the combination defined in claim 2, each of the drawbars terminating in a coupling hook and each having a downwardly extending eye on its under surface adjacent the folding joint whereby said eye is presented rearwardly when the tongue is folded into upright position and is available for engaging the hook on the tongue of a similar vehicle.

CHARLES G. CLEMENT.